(12) United States Patent
Birke et al.

(10) Patent No.: US 7,871,544 B2
(45) Date of Patent: *Jan. 18, 2011

(54) FILMS FOR ELECTROCHEMICAL STRUCTURAL ELEMENTS AND METHOD FOR PRODUCING SUCH FILMS

(75) Inventors: Peter Birke, Ellwangen (DE); Fatima Salam, Ellwangen (DE)

(73) Assignee: Fraunhofer-Gesellschaft zur Foerderung der angewandten Forschung e.V., Munich (DE)

( * ) Notice: Subject to any disclaimer, the term of this patent is extended or adjusted under 35 U.S.C. 154(b) by 106 days.

This patent is subject to a terminal disclaimer.

(21) Appl. No.: 12/018,392

(22) Filed: Jan. 23, 2008

(65) Prior Publication Data

US 2008/0113272 A1    May 15, 2008

Related U.S. Application Data

(63) Continuation of application No. 10/148,283, filed on Aug. 5, 2002, now Pat. No. 7,335,321.

(51) Int. Cl.
*H01B 1/00* (2006.01)
*B05D 5/12* (2006.01)
*H01M 2/14* (2006.01)

(52) U.S. Cl. .............. 252/500; 427/372.2; 429/231.95; 429/129

(58) Field of Classification Search ................. 252/500, 252/512–514, 518.1, 62.2; 429/217, 218.1, 429/129, 231.95, 300; 427/372.2
See application file for complete search history.

(56) References Cited

U.S. PATENT DOCUMENTS

| | | | |
|---|---|---|---|
| 5,009,970 A | 4/1991 | Kronfli et al. | |
| 5,041,346 A | 8/1991 | Giles | |
| 5,456,000 A | 10/1995 | Gozdz et al. | |
| 5,576,115 A | 11/1996 | Capuano et al. | |
| 5,728,489 A | 3/1998 | Gao et al. | |
| 5,972,055 A | 10/1999 | Gao et al. | |
| 6,156,458 A | 12/2000 | Brodd et al. | |
| 6,416,905 B1 | 7/2002 | Bronstert et al. | |
| 6,706,441 B1 * | 3/2004 | Birke et al. | 429/218.1 |

(Continued)

FOREIGN PATENT DOCUMENTS

CA        2347177        4/2000

(Continued)

*Primary Examiner*—Mark Kopec
(74) *Attorney, Agent, or Firm*—Duane Morris LLP

(57) ABSTRACT

The invention relates to a paste-like mass that can be used in electrochemical structural elements, including a heterogeneous mixture of (1.) a matrix (A) containing at least one organic polymer, precursors thereof, or prepolymers thereof, or consisting of said components, (2.) an electrochemically activatable inorganic material in the form of a solid substance (B), said material not being soluble in said matrix and in water, and (3.) a material (C) which is capable of improving the transport of a liquid electrolyte into and the storage thereof within the structural element, with the proviso that said material (C) is not a material which simultaneously has conductivity improving properties, if said solid substance (B) is a material that is suitable as an electrode material. From said mass, layers (films) and electrochemical composite layers can be produced that are subsequently impregnated with an electrolyte solution preferably of electrolytes dissolved in plasticizers for said matrix (A). In this manner, electrochemically active structural elements such as batteries and accumulators are obtained.

24 Claims, 3 Drawing Sheets

U.S. PATENT DOCUMENTS

| | | |
|---|---|---|
| 6,991,874 B1 | 1/2006 | Mohwald et al. |
| 7,118,694 B2 | 10/2006 | Bronstert et al. |
| 7,479,350 B1 * | 1/2009 | Neumann et al. ............ 429/217 |
| 7,524,580 B1 * | 4/2009 | Birke et al. ................. 429/217 |
| 2001/0021473 A1 | 9/2001 | Bauer et al. |
| 2002/0160270 A1 | 10/2002 | Bronstert et al. |
| 2009/0263715 A1 * | 10/2009 | Birke et al. ................. 429/207 |

FOREIGN PATENT DOCUMENTS

| | | |
|---|---|---|
| CA | 2370818 | 10/2000 |
| DE | 19713046 | 3/1997 |
| DE | 19839217 | 8/1998 |
| DE | 19908532 | 2/1999 |
| EP | 0557250 | 1/1993 |
| WO | WO 98/18173 | 4/1998 |
| WO | WO 98/26468 | 6/1998 |
| WO | WO 00/13249 | 3/2000 |
| WO | WO 00/24068 | 4/2000 |
| WO | WO 00/63984 | 10/2000 |

* cited by examiner

FILMS FOR ELECTROCHEMICAL STRUCTURAL ELEMENTS AND METHOD FOR PRODUCING SUCH FILMS

CROSS REFERENCE TO RELATED APPLICATION

This application is a continuation of application Ser. No. 10/148,283, filed Aug. 5, 2002, now U.S. Pat. No. 7,335,321.

FIELD OF THE INVENTION

The present invention relates to novel materials with electrochemical properties, in particular to films and to composite layers produced therefrom as well as to paste-like masses which are suitable for the production of said films. The invention is primarily suitable for the production of batteries and accumulators, and in particular also for rechargeable systems made in film technology which in the following are designated as cells or generally as "systems", or as electrochemically active or electrochemically activatable composite layers.

BACKGROUND OF THE INVENTION

Since the beginning of the 1970's there have been attempts to produce electrochemical structural elements such as accumulators or the like in the form of thin layers. The goal has been to obtain composite films that are both flexible enough that they can be, for instance, rolled up or made to conform to another desired shape and that also have particularly favorable charging and discharging properties due to an extremely high contact area between the individual electrochemical components, such as electrodes and electrolytes, relative to the volume of the active electrochemical material used. Apart from a few exceptions, this construction (film technology) was to present substantial advantages. In general, it will not be used only if (a) extreme requirements are to be made on the system, or (b) particular electrochemical advantages exist.

In patent literature, a number of methods for producing such films has been described. As far as films are concerned that are provided as electrolyte layers in structural elements to be produced therefrom, two different approaches exist.

According to the first approach, a paste is produced from all essential components. Said paste then serves as a basic material for the film. For producing the paste, a solid electrolyte is dissolved in the paste material; thereupon, a wetting or a cross-linking thin layer of said electrolyte is deposited within the film by extraction of the solvent. In the U.S. Pat. No. 5,009,970, polyethylene oxide (PEO) is used as a polymer which is mixed with an adequate lithium salt in water, whereby a complex of the two components is obtained. The PEO is cross-linked by radiation. A hydrogel is obtained that is to be dried subsequently under vacuum. U.S. Pat. No. 5,041,346 also describes an oxymethylene cross-linked variant of an ethylene oxide polymer electrolyte which additionally contains a softener. However, it has been reported that although the ion conductivity of such complexes compared to pure solid lithium salt is drastically increased, it is still not sufficient for use as an electrolyte layer in electrochemical structural elements. In fact, the most homogeneous deposition is obtained by said method; however, the high price of a mechanical instability of the film obtained (tearing, rolling up, sticking) has to be paid. A further disadvantage is that the soluble lithium conductors that are used according to this technology are hygroscopic, partly even susceptible to hydrolysis. Moreover, water is not only adsorbed, but usually incorporated as crystal water. Besides a very complicated storage of the films produced in this manner (storage has to be made in drying chambers), the films can practically not be laminated without steam bubbles, since the water, due to the tight bond to said substances, is not extractable by conventional methods. Decontactings, holes to the point of small explosion craters and a deliquescence of the laminate are usual results, for which reason said method is advantageously only applicable to pastes only.

According to the second strategy, a microporous sponge structure is provided. In this respect, U.S. Pat. No. 5,456,000 describes rechargeable battery cells which are produced from self-supporting films by lamination of electrode and electrolyte cells. A film or a membrane is used as positive electrode which has separately been produced from $LiMn_2O_4$ powder in a matrix solution of a copolymer and has subsequently been dried. The negative electrode consists of a dried coating of a powderized carbon dispersion in a matrix solution of a copolymer. Between the electrode layers, an electrolyte/separator membrane is provided. For this purpose, a poly(vinylidene fluoride) hexafluoropropylene copolymer in acetone or THF or the like is reacted with a plasticizer that is suitable as a solvent for electrolyte salts. The films produced from these components are laminated. For activating the battery, it is immersed into the respective electrolyte solution, thereby soaking with the electrolyte solution.

Due to the high proportion of plasticizer, the films show a very bad aging resistance; after storage periods of several weeks, modifications in consistency and brittleness to the point of decomposition to powder are observed which is possibly due to an interaction with environmental moisture. Moreover, due to the high proportion of plasticizer, lamination can only be effected at a temperature which is considerably decreased relative to the melting point of the polymer. Therefore in the variant described as preferred, the plasticizer is expelled in advance, which requires expensive washing steps. Moreover, the absorption capacity of the electrolyte is reduced, since a large proportion of the pores is reduced in size or even closed by laminating the washed films. Therefore, it is particularly preferable to wash the cell after lamination only. The washing step yet causes tensions and decontactings in a cell produced with said film; the mechanical stability is thus considerably affected. Also, electrochemical decompositions are observed if the cell is activated in a later stage. A further disadvantage is the direct contact of the subsequently filled-in liquid electrolyte with the contact gauzes which are usually made from aluminum on the positive side and from copper on the negative side, said direct contact being due to the porous structure. Consequently, decompositions of the electrolyte between two metals without reference can occur.

Neither is it advantageous therefore to incorporate the electrolyte homogeneously into the organic paste material provided for the production of the films, as has been proposed so far, nor is it advantageous to provide a high degree of porosity of the films that has to be provided by washing out plasticizer—usually several times.

The problem of the present invention is to provide films having improved properties from which electrochemical structural elements, particularly accumulators and batteries, can be produced in the form of thin composite layers. The films thus produced shall not present the aforementioned disadvantages of prior art. Moreover, paste-like masses are provided from which such films can be produced.

SUMMARY OF THE INVENTION

In order to solve this problem, it is proposed to neither produce the films from a paste having homogeneous components, i.e. electrochemically activatable materials that are soluble in the polymer material, nor to provide electrochemically active composite films having a high degree of porosity, the ion conduction of which exclusively occurs by the aid of a liquid. Rather, paste-like masses that can be used in electrochemical structural elements for producing respective films are provided that comprise a heterogeneous mixture of a matrix (A) containing at least one organic polymer, precursors thereof, or prepolymers thereof, and if desired a plasticizer, or consisting of said components, and an electrochemically activatable inorganic material in the form of a solid substance (B), said material not being soluble in said matrix. In addition, films and electrochemically active composite layers produced from said masses are provided.

BRIEF DESCRIPTION OF THE DRAWINGS

The present invention is explained in the attached drawings, in which.

DETAILED DESCRIPTION OF THE INVENTION

Figure 1:
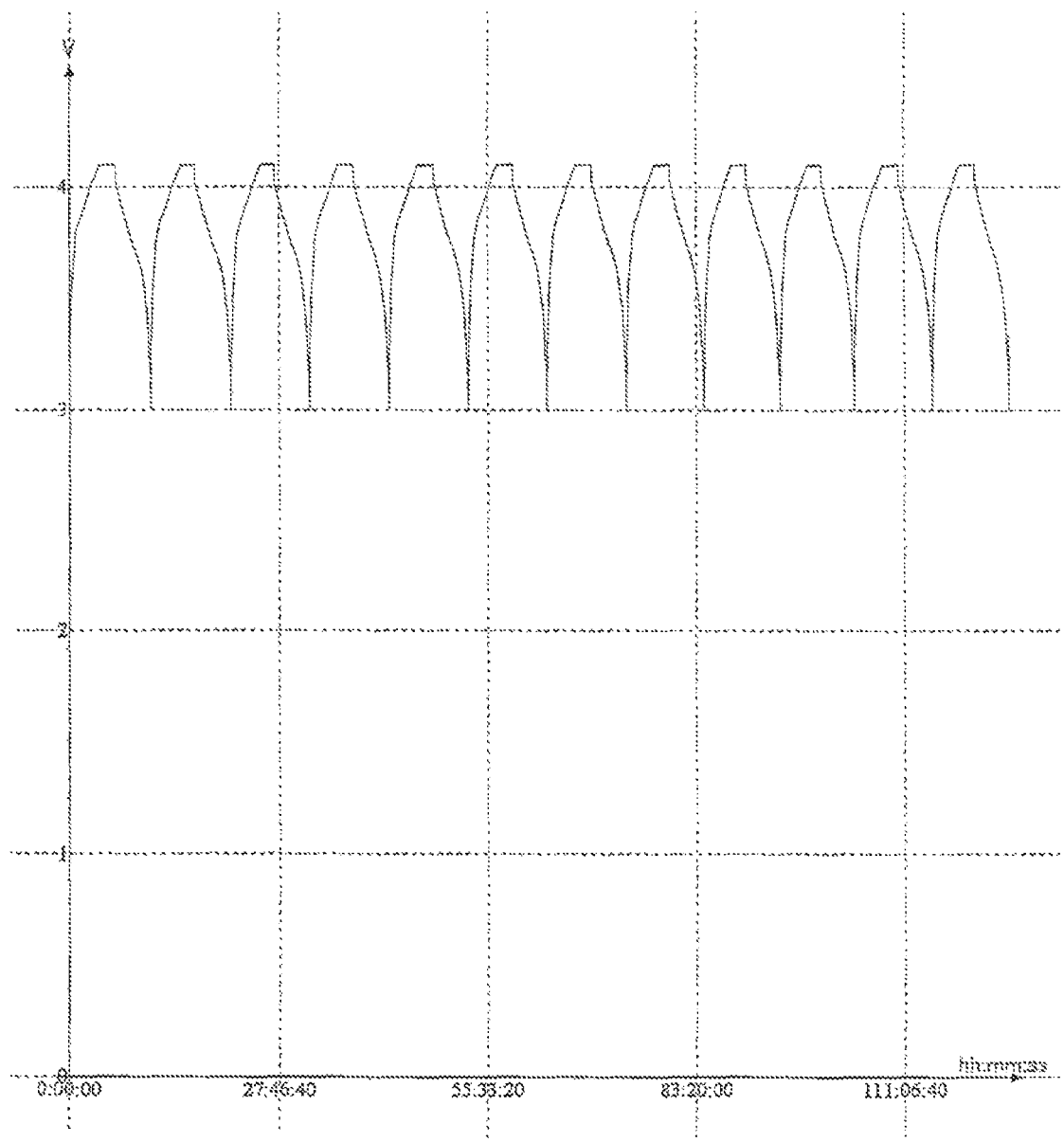
FIG. 1 demonstrates the cycle behavior ($11^{th}$-$22^{nd}$ cycle) of a cell in accordance with claim 20.

The term "that can be used in electrochemical elements" implies that the electrochemically activatable inorganic material that is in the form of a solid substance must be an ion-conducting or electron-conducting material that is suitable as an electrode material or as a solid electrolyte.

Since the films are produced from heterogeneous paste mixtures, the parameter which determines the kinetics for the chemical diffusion, i.e. for the transport of atoms into and out of the active material of the negative and of the positive electrodes, is the grain size being in the μm range and not the thickness of the film which is higher by at least two orders of magnitude. This is because the chemical diffusion is mathematically described by the diffusion coefficient $$\tilde{D} = \frac{L^2}{2t}, \quad (1)$$

wherein L is the diffusion length and t is the diffusion time. When solving said formula with regard to the time t, one obtains $$t = \frac{L^2}{2\tilde{D}} \quad (2)$$

The diffusion time determines rapid electrode kinetics and relaxation and therefore the maximum possible current discharge and service life (high polarizations are detrimental to the host lattice of the electrodes) of an accumulator or another electrochemical structural element. The time can be influenced either by the geometry, i.e. the effective diffusion length, or by the diffusion coefficient, i.e. by a variety of electrode materials, the diffusion coefficient itself being an electrochemical material property. Since electrode materials on the one hand should meet capacity, environment and cost requirements, and on the other are responsible of the desired volumetric and gravimetric performance density of the electric structural element (e.g. of the accumulator), it is easier in most cases to reduce the diffusion length.

The proposal of using electrochemically active powders (material (B)), the grain size of which is as small as possible, results therefrom. It is required that said powders are embedded in a mixed conducting, i.e. both, ion and electron conducting matrix, wherein both the ion conduction and the electron conduction in said matrix have to be sufficiently rapid to have no decelerating effect, and thus, the criterion $$\tilde{D}_{matrix} >> \tilde{D}_{electrode\ material} \quad (3)$$

has to be fulfilled, since the matrix determines the effective geometry of the cell. Thus, because the chemical diffusion is a mixed and a simultaneous transport of ions and electrons, the rapid transport of both species over and through the matrix becomes essential, in case the advantage of the small diffusion length in the μm range of the electrode material shall be made use of.

The most conductive metals have a conductivity σ of $10^6$ S/cm; immediately followed by specific modifications of the carbon. The highest ionic conductivities are achieved in molten salts or in concentrated $H_2SO_4$, being in a range of $10^0$-$10^1$ S/cm. The best organic lithium ion conductors are in a range of $10^{-2}$ S/cm; they are used in lithium cells. Therefore, the general statement $$\sigma_{bionic} << \sigma_{electronic}$$

can be made. Whereas the requirement with regard to the electronic conductivity can be met easily by adding carbon blacks having a high conductivity, an electrolyte has to be present in the film in a form wherein it is finest and best dispersed in order to compensate the disadvantage in conductivity by the geometry of a large surface.

Therefore, a material (C) is added to the mass provided for the paste in accordance with the invention, said material preferably being electrochemically inert to a large extent, but having a transport and/or a storage and/or a swelling effect for a liquid electrolyte.

The films (negative electrodes, positive electrodes and electrolytes) produced from these pastes can be laminated to obtain a composite film which can subsequently be impregnated with the solution of a—second—electrolyte, or the electrolyte film is separately filled with said solution of a second electrolyte already prior to the production of the composite layer. Preferably, said material (C) is not only added to the pastes that are provided for the production of an electrolyte film, but also to those pastes from which electrode films shall subsequently be produced in order to ensure the maintenance and mobility of the electrolyte also in the electrodes.

Figure 2A:
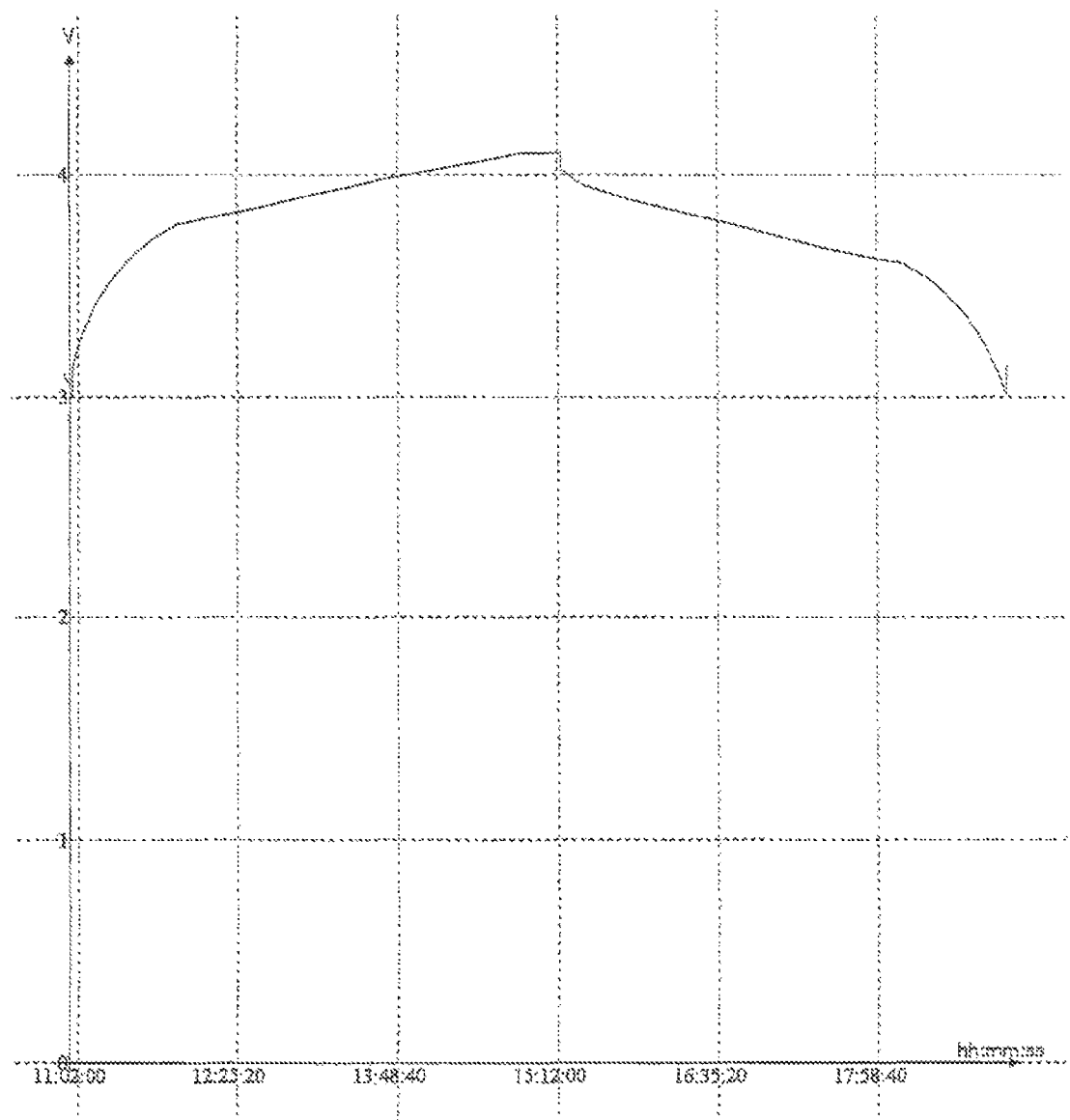
FIGS. 2a and 2b each show an enlarged view of a detail of cycle no. 12.
Figure 2B:
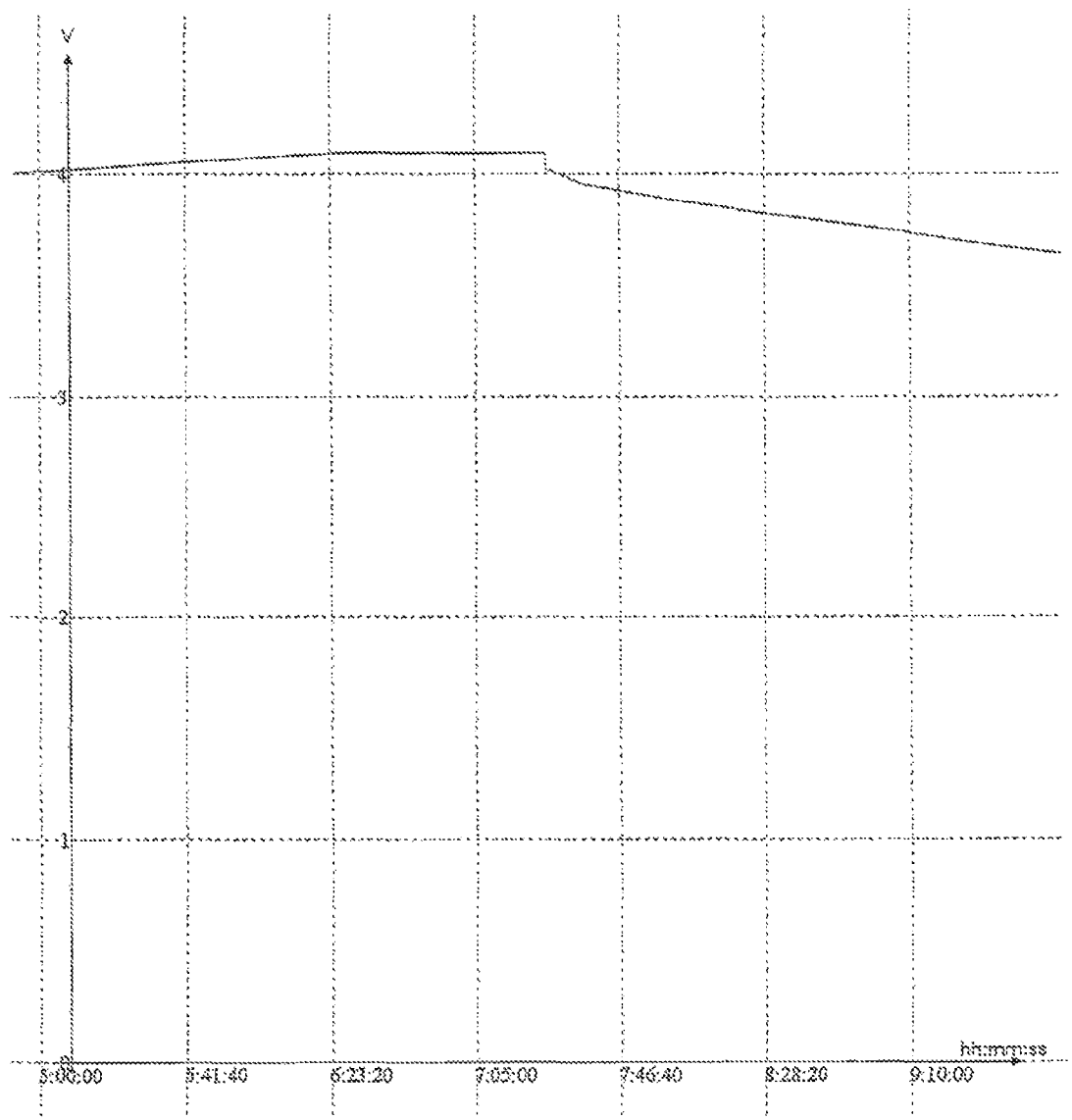

The attached figures illustrate the present invention, FIG. 1 demonstrating the cycle behavior ($11^{th}$-$22^{nd}$ cycle) of a cell in accordance with claim 20, whereas FIGS. 2a and 2b each show an enlarged view of a detail of cycle no. 12.

The material (C) may optionally be selected from among all those substances and mixtures thereof that due to their structure and in combination with matrix the (A) due to a capillary effect or the like, respectively, will increase the absorption capacity for an electrolyte solution of the films produced from the paste. For example, materials can be selected that due to their porous structure, their high specific surface or their high swelling capacity, develop strong capillary forces for the electrolyte solution to be absorbed. It is possible that said material (C) has ionic or electronic conductivity properties that are important for the electrochemistry of the films or of the electrochemical structural elements, respectively. Preferably, however, said material (C) is electrochemically inert or substantially inert.

Examples of substances that can be used as material (C) are pumice powder, zeolites, carbon nanotubes, chamotte or silica gel, acetylene black, activated carbon, lampblack, carbon blacks, carbons having a high specific surface and/or conductivity (e.g. Printex carbon blacks by Degussa) fumed silica (e.g. Cab-osil by Fluka), or kieselguhr. In fact, part of said substances have already been proposed to be used as supporting or filling agents. However, this was never the case in connection with a film or a composite film, respectively, that is/are to be filled further with an electrolyte.

Said material (C) can favorably be incorporated into the paste-like mass in a quantity of 0.05-50% by weight, preferably in a quantity of about 2 to 10% by weight, relative to the total components of the paste material.

According to a particular embodiment of the invention, the electrochemically active or activatable material (B) itself also has such an absorption and maintaining capacity for the electrolyte. Materials having said property are for example MCMB (mesocarbon microbeads, that can be produced by condensation of tar at 400° C. and subsequent graphitization of the material obtained at a temperature of 2800° C.) as a material for a (negative) electrode, or natural spodumene having a grain size of $\leqq 75$ µm, preferably of $\leqq 40$ µm, most preferably of $\leqq 1$ µm as an electrolyte material. Such materials can be processed in an excellent manner together with the remaining components of said matrix (A) to obtain a mechanically stable film; also, they easily absorb an electrolyte solution. In extreme cases, the addition of a material (C) is therefore completely dispensable.

The mass obtains its paste-like consistency by using a suitable matrix (A). The term "paste-like" shall mean that the mass, once it has been produced, can be processed using usual paste application methods, for example by calendering, extrusion, casting, brushing, spatula coating, knife coating, or it can be applied to a base by various printing methods, whereby mainly but not exclusively self-supporting layers shall be produced. Depending on the need, the mass can be made to be relatively thin to very viscous.

A plurality of materials can be used for the matrix (A). Systems containing solvents or solvent-free systems can be used. Solvent-free systems that are suitable are, for example, cross-linkable liquid or paste-like resin systems. Examples are resins made of cross-linkable addition polymers or condensation resins. For instance, pre-condensates of phenoplasts (novolaks) or aminoplasts can be used that are finally cross-linked to the layer of an electrochemical composite layer after the paste-like mass has been formed. Additional examples are unsaturated polyesters, such as polyesters that can be cross-linked to styrene by graft copolymerization, epoxy resins that are curable by bifunctional reaction partners (for example bisphenol A epoxy resin, cold cured with polyamide), polycarbonates that can be cross-linked such as a polyisocyanurate that can be cross-linked by a polyol, or a binary polymethyl methacrylate, which can also be polymerized with styrene. In any of these cases, the paste-like mass is formed from the more or less viscous pre-condensate or non-cross-linked polymer and the plasticizer as matrix (A), or using essential components thereof, together with component (B).

Another option is the use of polymers or polymer precursors together with a solvent or swelling agent for the organic polymer. In principle, there is no limit in terms of the synthetic or natural polymers that can be used. Not only polymers with a carbon backbone chain can be used, but also polymers containing hetero ions within the backbone chain, such as polyamides, polyesters, proteins, or polysaccharides. The polymers can be homopolymers or copolymers; the copolymers can be statistical copolymers, graft copolymers, block copolymers, or polyblends, there is no limitation. In terms of polymers with a pure carbon backbone, natural or synthetic rubbers can be used, for instance, halogenated, e.g. fluorinated hydrocarbon polymers such as Teflon, polyvinylidene fluoride (PVDF), polyvinylidene chloride, or polyvinyl chloride are particularly preferred, since these make it possible to obtain particularly good water-repellant properties of the films or layers formed from the paste-like mass. This imparts particularly good long-term stability to the electrochemical structural elements thus produced. Additional examples are polystyrene or polyurethane. Particularly preferred examples of copolymers are copolymers of Teflon and of amorphous fluoropolymer, as well as polyvinylidene fluoride/hexafluoropropylene (commercially available as Kynarflex). Also, other polymers that are capable of swelling, such as polyethylene oxide, are preferred. Examples of polymers having heteroatoms within the main chain are polyamides of the diamine dicarboxylic acid type or of the amino acid type, polycarbonates, polyacetals, polyethers, and acrylic resins. Other materials include natural and synthetic polysaccharides (homeoglycans and heteroglycans), proteoglycans, for example, starch, cellulose, methylcellulose. In addition, substances such as chondroitin sulfate, hyaluronic acid, chitin, natural or synthetic waxes, and many other substances can be used. In addition, the aforesaid resins (precondensates) can be used in solvents and diluents.

The aforementioned substances are incorporated into the paste material in a suitable manner in a quantity of 0.05 to 50% by weight, preferably in a quantity of 2 to 30% by weight, relative to the total quantity of said paste material. A quantity of $\leqq 10$% by weight is often sufficient.

One skilled in the art is familiar with solvents and swelling agents for the aforesaid polymers.

A plasticizer (also designated as softener) for the polymer(s) used is an optional component of the matrix (A). "Plasticizer" or "softener" should be understood to define substances the molecules of which are bonded to the plastic molecules by secondary valence forces (Van der Waals forces) and which thus reduce the interacting forces between the macromolecules and therefore reduce the softening temperature and the brittleness and hardness of the plastics. Thus, a number of substances which are usually designated as swelling agents is understood to be comprised therein. Using a plasticizer in accordance with the invention effects high mechanical flexibility of the layer that can be produced from the paste-like mass.

In accordance with the invention, the electrochemically activatable material of the paste-like mass (B) is not soluble in the plasticizer (nor of course in the solvent or swelling agent possibly used for the polymer).

It is particularly preferable to select the plasticizer from among substances and mixtures of substances carrying the group

wherein independently of each other $A^1$ and $A^2$ can be $R^1$, $OR^1$, $SR^1$ or $NHR^1$, or $A^1$ and $A^2$ together with D form a hetero-5-ring, and D can be C=O, S=O, C=NH or C=$CH_2$ and further, if D forms said hetero-5-ring with $A^1$ and $A^2$, D can also be O, S, NH or $CH_2$. $R^1$ is a (straight-chain or branched-chain optionally cyclic) $C_1C_6$ alkyl radical. Preferably, $R^1$ is methyl, ethyl, n- or iso-propyl, n- or iso-butyl.

By the aforesaid criterions, mainly carbonates or esters and their sulfur and amino analogues are comprised. Substances that are particularly preferred as plasticizer are dimethyl sulfoxide, dimethyl carbonate, ethyl methyl carbonate, diethyl carbonate, methyl propyl carbonate, ethylene carbonate, ethylene sulfite, N—N'-ethylene urea, propylene carbonate, dioxolane, tetrahydrofurane, and butyrolactone.

In the composition according to the invention, the plasticizer has a direct effect on the consistency, homogeneity and flexibility of the film. Substances having an asymmetric ring structure are particularly preferred; very good results are also obtained with a symmetric ring structure, said results being only slightly inferior to those of the first group. Without a closed ring, the result goes somewhat down, possibly due to an increased volatility. Particularly surprisingly, the storage life and the flexibility of the material are considerably improved, even if the plasticizer proportion is very small. These properties are so much more astonishing as many substances which are comprised by the definition of the plasticizer to be used according to the invention have rather been known as swelling agents so far.

It is preferred to use the plasticizer in a quantity that is not too large. 0.05-50% by weight can be suitable; up to 12% by weight are preferably, about 10% or less are more preferably, and not more than about 5% by weight are most preferably present in the matrix, the quantity being in relation to the quantity of the electrochemically activatable material. It is recommended to keep the quantity of plasticizer always as small as possible for the respective system. If it is desirable for technical processing considerations to incorporate a relatively large quantity into the paste-like mass, part of the plasticizer can subsequently (e.g. after forming the film) be removed, for instance by vacuum extraction e.g. at up to $10^{-2}$ mbar, if necessary at an increased temperature (up to about 150° C., preferably at 65-80° C.). Alternatively, the extraction can be effected at ambient pressure by drying and heating at preferably 120° C., if necessary up to 200° C.

An advantage of small plasticizer quantities is, among others, the reduction of the incorporation of water into the films (plasticizers are usually hygroscopic), which might remain there and be enclosed therein. In accordance with the invention, an extremely small inclusion of water during production is achieved, and the films thus produced can easily and elegantly be dried using standard methods.

The paste-like mass, if provided for producing an electrode film, may further contain a conductivity improving agent (D), preferably in a proportion by weight of about 2 to 35% by weight, relative to the solid substance (B) that is suitable as an electrode material. Carbon black, graphite, elementary metals, nitrides or mixtures of said substances may for example be used as conductivity improving agents.

From the inventive paste-like masses, thin layers, e.g. films, are produced from which thin-film batteries and other similar electrochemical structural elements can be produced. The individual layers or films of these elements are also called "tapes". Said layers or films or those obtained therefrom by suitably placing the respective electrochemically active or activatable layers upon one another can subsequently be immersed into a suitable electrolyte solution, as mentioned.

The present invention therefore furthermore comprises electrochemically active or activatable layers or films that can be produced from the paste-like masses described in the foregoing, that are self-supporting or that are placed on a substrate, preferably in the thicknesses indicated. The layers are preferably flexible.

The consistency of the films is a result of use of the matrix (A) described above in more detail, said matrix consisting of supporting polymers as described above which if necessary (and preferably) are soluble in a solvent like acetone, and if desired of one or more plasticizer(s) (softener(s)) as described above. Further, they contain a powdered electrode or electrolyte material (B) that is insoluble in the film. If electrode films are concerned, a conductivity improving agent (D) as described above for the paste-like masses can preferably be contained in addition. In accordance with the invention, they further contain a material (C) as described above for the paste-like masses, said material being capable of improving the transport and the storage of a liquid electrolyte within the film. Whereas the solvent that is optionally used for producing the paste is preferably removed during or after the paste has solidified to film shape (e.g. by degasifying in vacuum and/or by heat), the plasticizer, if present, preferably remains at least partly in the film obtained. The fact that the plasticizer remains in the film contributes to avoiding sedimentation of powdered components during film production. In fact, many of the polymer compositions described in the foregoing (e.g. a preferred composition of a copolymer of polyvinylidene fluoride/hexafluoropropylene, (PVDF/HFP, Kynarflex) or a composition using substantial parts thereof) have only a small degree of crystallinity, a high flexibility and only a low tendency to embrittlement. However, a possible separation and sedimentation during film production can not be avoided with certainty.

For producing both the self-supporting layers (films, tapes) and the layers that can be placed on a substrate, one can fall back to methods known in prior art that can be used for the corresponding polymer materials of the matrix. Important techniques are the so called tape casting, the so-called "reverse-roll-on-coating", casting, spraying, brushing, or rolling. The consolidation of the paste-like masses then occurs, depending on the material, for example by curing (of resins or other precondensates), by cross-linking prepolymerisates or linear polymerisates, by evaporating solvents, or in a similar manner. In order to obtain self-supporting films, a suitable paste-like mass can for instance be formed in the appropriate thickness on calenders. Standard technology can be used for this. Self-supporting layers can also be formed by applying the paste-like mass to a substrate and removing the layer produced after it has consolidated. The coating process can be performed using conventional paste application methods. For instance, application can be performed by brush, rake, spraying, spin coating and the like. Printing techniques can also be used. The lamination of films to a composite is effected at a suitable temperature, for the system PVDF/HFD mentioned before for instance in an appropriate manner at 100°-250° C., preferably in the range of 135-150° C. If necessary, temperature gradients may be applied. Continuous films can be laminated in a dynamic continuous way using a pressure of preferably about 0.5 kg/20 cm$^2$.

In one embodiment of the invention, cross-linkable resin masses (pre-condensates) are used as described above for the paste-like masses, and are cured by UV or electron radiation once the layer has been formed. Curing can naturally also be thermal or chemical (for example by immersing the produced layer in an appropriate bath). If necessary, suitable initiators or accelerators or the like are added to the masses for respective cross-linking.

The production of films provided for electrochemical structural elements in accordance with the invention has a number of advantages: (a) The production of large numbers of pieces having the storage life of the basic materials is favorable (the layers that have not yet been connected to an electrochemical composite layer can be stored very safely). (b) A flexible and variable shaping is possible. (c) The films can be stored in a space-saving manner (e.g. by stacked and/or rolled up film webs). (d) Due to the absence of low-boiling materials and to the presence of solid ion conductors, a higher temperature resistance is obtained. (e) Due to the solid condition of the electrochemically activatable components, the films are leakage-safe and corrosion-resistant. (f) Since in a preferred manner, matrices and plasticizers are used that are substantially recognized as safe with regard to health, the binding material can be extracted after use, and the basic materials can be recovered by filtration and can be recycled. As mentioned, the films, after having been produced, are impregnated with a (second) dissolved electrolyte prior to being laminated to a composite layer or thereafter. This can for instance be effected by spraying an electrolyte solution onto the film or onto the laminated composite film or by immersing the film or the composite film into the respective electrolyte solution. This can be effected in a particularly preferred manner with such films/composite films from which excess plasticizer has been removed in advance as described above, or for which only a very small quantity of plasticizer has originally been used. After impregnating the film or the composite film, it is advantageously dried. Whereas this is usually effected by heating it for some hours, e.g. maintaining it at a temperature of 70-90° C., the addition of the material (C) provides for a reduction of this time and/or a conversion already at room temperature. During this "conversion", a very thin, flexible, ion conducting layer of reaction products of polymer, softener and electrolyte can be formed. As a consequence of the absorption process described, the electrolyte is jellified or solidified; despite the use of a dissolved electrolyte, the tape or the cell (i.e. the film or the composite film) thus obtained is particularly leakage-safe.

Suitable electrolytes are, for instance, salts of lithium. $LiClO_4$, $LiNO_3$, $LiBF_4$, $LiPF_6$, $LiSO_3CF_3$, $LiC(SO_2CF_3)_3$ or $Li(CF_3SO_2)_2N$ or mixtures thereof are used with particular advantage. Further, explosive substances, like the perchlorate or nitrate salts that have been mentioned above, can be used due to the jellification or solidification, without an explosion possibly occurring when charging even with high currents, since an explosion-safe system (cell) is provided by the inventive absorption and bond of the liquid electrolyte. Preferably, plasticizers are used as solvents that have been defined above as an optional component of the matrix (A), and among them preferably such plasticizers having the group $A^1$-D-$A^2$, as also defined above, alone or in mixture. The plasticizer selected or the plasticizer mixture selected should be liquid at the processing temperature.

According to a preferred embodiment of the invention, the solvent for the electrolyte comprises a substance having good swelling properties. Said substance can for example be one of the aforementioned plasticizers, when having such properties, e.g. propylene carbonate. Such a substance is particularly preferably contained in a quantity of 2 to 10% by weight, more preferably of about 5% by weight, relative to the total solvent for the electrolyte. If a too large quantity of such a substance is added or if plasticizers are used as solvents for the electrolyte that in all have a too strong swelling effect, said too strong swelling first causes decontactings within the cell, then possibly leading to a complete softening and decomposition of the cell. On the contrary, if swelling is only moderate, said swelling has the effect that the electronic and ionic contact within the films and of the films with each other is improved by closing small cavities, which can occur for example by extraction of the solvent, when the films are dried.

In a further special embodiment of the invention, the film matrix (A) contains a plasticizer, and the liquid electrolyte provided for the impregnation contains or consists of an electrolyte that is also dissolved in the plasticizer. The same, another or partly another plasticizer may be present in the matrix (A) or may serve as a solvent for the electrolyte, respectively. The quantity of plasticizer that is present in the film is preferably selected such that the film is not, particularly by far not saturated with the plasticizer—said selection being made by the addition of respective quantities during the production of the basic paste-like masses, or by extracting a part thereof later, as described in the foregoing. Consequently, during the impregnation with the electrolyte solution, the plasticizer penetrates into the film via the existing concentration gradient and serves as a vehicle for the absorption of the dissolved electrolyte material. In extreme cases, the complete electrolyte can be transferred into the film this way, so that a material (C) as defined in the foregoing is not required in the film at all.

The inventive films are not particularly limited in their thickness (width); one skilled in the art will respectively select the thickness which is appropriate for an application. For instance, suitable thicknesses are from about 10 μm, more preferable from about 50 μm, up to about 1 to 2 mm and if necessary more (e.g. up to about 10 mm, such films possibly being provided for stamping out small-dimensioned forms, e.g. for batteries and accumulators to be used in medicine, such as hearing aid batteries). Films for the production of electrochemical structural elements in so-called "thick-layer technology" have a thickness in the range of preferably about 50 μm to 500 μm, most preferably in the range of about 100-200 μm. In accordance with the invention it is, however, also possible to produce corresponding thin-layer structural elements (this term comprises thicknesses of preferably 100 nm up to a few μm). This application may, however, be restricted, since in a plurality of cases, corresponding structural elements may not satisfy usual capacity requirements. The application for backup chips is however possible.

The present invention furthermore relates to composite layers having electrochemical properties, particularly such as rechargeable accumulators and other batteries that are formed by or comprise a corresponding sequence of the aforesaid layers.

For producing composite layers, the individual paste-like masses can be applied layer by layer upon one another by means of paste application methods. Either each individual layer can be cross-linked per se or it can be freed from solvent or made into layer form in some other manner; however, it is also possible to consolidate the individual matrices by cross-linking or evaporating the solvent or swelling agent or the like once application of all of the required layers has been completed. This latter is advantageous, for instance, if the individual electrochemically activatable layers are applied using a printing method that occurs analogous to polychromy. An example of this is the flexographic printing technique, by means of which multiple meters/second of a substrate can be imprinted continuously with the required electrochemically activatable layers.

Alternatively, every layer or film can be converted individually into its final consolidated state. If these are self-supporting films, the appropriate components of the structural element to be formed can be stored separately, e.g. as rolled films, and subsequently be joined together by lamination. Conventional laminating techniques can be used for this. These include, for example, extrusion coating, whereby the second layer is bonded to a carrier layer by pressure rollers, calendar coating using two or three roll nips, wherein the substrate web runs in in addition to the paste-like mass, or doubling (bonding under pressure and counterpressure of preferably heated rollers). One skilled in the art will not have any problem finding the techniques that are appropriate depending on the selection of the matrices for the paste-like masses.

As stated in the foregoing, the inventive paste-like masses and layers or films produced therefrom are suitable for a plurality of electrochemical structural elements. One skilled in the art is able to select the same solid substances (B) that he would use for classic electrochemical structural elements, that is, substances (B) to which no plastics have been added.

In particular for lithium systems that can provide the highest practical volumetric and gravimetric energy densities, one is dependent on films. This is due to the requirement that large contact surfaces for compensating the ionic conductivity have to be provided, which, in turn, is smaller by three orders of magnitude compared to aqueous systems. Markets with high piece numbers in million, like the 3C market, require a continuous production method via films from the roll, since otherwise the required cycle times are not achievable.

In the following, a number of such lithium systems shall be mentioned as an example:

| | |
|---|---|
| lower contact electrode | Al, Cu, Pt, Au, C |
| positive electrode | all possible combinations of multinary compounds of lithium cobalt oxides, lithium nickel oxides and lithium manganese oxides, optionally substituted with magnesium, aluminum or fluorine |
| electrolyte | $Li_{1.3}Al_{0.3}Ti_{1.7}(PO_4)_3$, $LiTaO_3 \cdot SrTiO_3$, $LiTi_2(PO_4)_3 \cdot Li_2O$, $Li_4SiO_4 \cdot Li_3PO_4$, |
| negative electrode | carbon (in an optional modification), $TiO_2$, $TiS_2$, $WO_2$, $MoO_2$, lithium titanate, a lithium-alloyable metal, oxide, iodide, sulfide or nitride, a lithium-alloyable semiconductor and heterogeneous mixtures thereof |
| upper contact electrode | Al, Cu, Mo, W, Ti, V, Cr, Ni |

Examples of use are lithium cells, lithium polymer cells, lithium plastic cells, lithium solid body cells or lithium ion cells.

However, the present invention is of course not limited to lithium-technology accumulators, but rather, as stated in the foregoing, comprises all systems that can be produced using "conventional" technology, that is, without incorporating an organic polymer matrix.

The following describes a few special embodiments of the paste-like masses that are suitable for special structural elements or structural element parts. For those electrochemically activatable parts that are not prior art, it should be clear that these substances can also be used in "bulk form", i.e., without the polymer matrix in appropriate electrochemical structural elements.

Appropriately selecting the electrochemically active substances makes it possible to produce electrochemical structural elements, such as accumulators, whose characteristics in the charge/discharge curves make it possible to selectively control the charge/discharge status of the accumulator. Thus, mixtures of two of the electrode materials cited in the foregoing, or of other appropriate electrode materials, can be used as electrochemically activatable solid substance (B) for the positive or negative electrodes, the materials having different oxidation and reduction stages. Alternatively, one of the two substances can be replaced with carbon. This results in characteristic runs or courses in the charge/discharge curves which makes it possible to advantageously detect the charge or discharge status of an accumulator produced using such masses. The curves have two different plateaus. If the plateau that is near the discharge status is achieved, this status can be indicated to the user so that he knows that he will soon need to recharge, and vice versa.

If carbon and an element that can be alloyed with lithium is incorporated into a paste-like mass provided for a negative electrode, this imparts to the electrode (with properties of an alloy electrode and an intercalation electrode) that can be produced therefrom a particularly high capacity that has improved electrochemical stability. In addition, the expansion in volume is lower than in a pure alloy electrode.

If the paste-like mass according to the invention is provided for an electrode, a conductivity improving agent (D) can be added additionally, as already mentioned. Graphite or amorphous carbon (carbon black) or a mixture of the two, but also a metallic powder or a nitride are suitable. Weight proportions of about 2.5 to about 35% by weight amorphous carbon relative to the electrochemically activatable component are particularly advantageous in this regard. If the mass is provided for a positive electrode, the lubricating effect of the carbon is an advantageous property to be mentioned that improves the mechanical flexibility of a layer produced from the paste-like mass. If the mass is provided for a negative electrode, additionally the electrochemical stability and the electronic conductivity are improved, as has been described in the foregoing.

The inventive paste-like mass can also be used for electrodes other than intercalation electrodes. An example of this is the use of metallic powder in combination with an alkali or earth alkali salt as the electrochemically activatable solid substance (B). A paste-like mass produced with this combination can be used to produce decomposition electrodes. The expansion in volume that is typical for intercalation electrodes does not occur in this case, which results in improved service life over time. An example of this is the combination of copper and lithium sulfate.

Surprisingly it has also been demonstrated that incorporating a phase mixture into the inventive paste-like mass consisting of $Li_4SiO_4.Li_3PO_4$, regardless of its intended electrochemical application, leads to an improvement in the plasticity of the electrodes or solid electrolytes produced therefrom. This requires that the phase mixture be ground extremely fine. The extremely small grain sizes must be the reason for an improved internal sliding effect.

Regardless of whether the solid substance (B) is an electrode material or an electrolyte material, it can consist of a lithium ion conductor and one or more additional ion conductors (Li, Cu, Ag, Mg, F, Cl, H). Electrodes and electrolyte layers made of these substances have particularly favorable electrochemical properties such as capacity, energy density, mechanical and electrochemical stability.

The components described in the foregoing from which the inventive paste-like mass is produced can be mixed in a conventional manner, preferably by vigorously agitating or kneading the components. Preferably, the organic polymer or its precursors are pre-dissolved or pre-swollen with the plasticizer in a solvent or swelling agent before the component (B) is added.

Embedding the solid substances (B) in the matrix (A) means that the powders of the electrochemically activatable substances do not have to be sintered at high temperatures, as is customary for "conventional" electrochemical structural elements. Such sintering would not result in the initial substances having a paste-like consistency.

The electrochemical structured parts that can be produced with the inventive paste-like masses are not limited. It is therefore understood that the embodiments described in the following are merely examples or particularly preferred embodiments.

Rechargeable electrochemical cells can be produced in this manner using thick-layer technology, i.e. with individual electrochemically activatable layers having a thickness of approximately 10 μm to approximately 1 to 2 mm and preferably of approximately 100-200 μm. If the electrochemical cell is to be based on lithium technology, the solid substances for the electrodes or electrolyte layers can be those substances that have already been enumerated in the foregoing for this purpose. At least three layers have to be provided in such cases, namely, one that functions as a positive electrode, one that functions as a solid body electrolyte, and one that functions as a negative electrode.

In accordance with the invention it has been demonstrated that particularly advantageous current densities can be obtained in the accumulator if certain limits are observed. As is known, current density can be adjusted by the resistance of the electrolyte. If it is too high, polarization can destroy the electrodes over the long term; if it is too low, the power of the produced accumulator is only sufficient for a few applications. The aforesaid limit is preferably 1 mA/cm². For instance, if the conductivity of an electrolyte is $10^{-4}$ S/cm, it is particularly advantageous for the electrolyte layer to be approximately 100 μm thick. A current density of 1 mA/cm² then causes a drop in voltage, caused by the resistance, that is a negligible 0.1 V. In contrast, if the conductivity of the electrolyte is $10^{-5}$ S/cm, for instance, the thickness of the electrolyte layer can be reduced to about 10 μm. It is therefore recommended that the layer thickness d be selected relative to conductivity $\sigma_{ion}$ and to an ionic resistance (Ω) and relative to the surface A such that the following formula is satisfied:

$$200\Omega < d/(\sigma_{ion} \cdot A)$$

The aforesaid three-layer cell (or any other desired electrochemical structural element, consisting of positive electrode/electrolyte/negative electrode) can additionally be provided with contact electrodes. It is useful that these comprise films of suitable materials (materials for contact electrodes that can be used in lithium technology are described earlier in this specification).

In a special embodiment of the invention, an additional thin plastic layer ("intermediate tape") is worked in between the lower contact electrode and the adjacent electrode and between the upper contact electrode and the adjacent electrode which plastic layer can also be produced using a paste-like mass of the present invention. This thin plastic layer should contain conducting metal elements or alloys of such elements that are suitable for transporting electrons from the electrode material to the contact electrode. Examples of this are the elements gold, platinum, rhodium, and carbon, or alloys of these elements, if the plastic layer is to be arranged between the positive electrode and the associated contact electrode. If it is to be arranged between the negative electrode and the contact electrode, the elements that are appropriate are nickel, iron, chromium, titanium, molybdenum, tungsten, vanadium, manganese, niobium, tantalum, cobalt, and carbon. The information provided in the foregoing about the electrodes and electrolytes also applies, of course, to the concentration and structure of the paste-like masses from which these layers are formed.

The electrochemical structural elements of the present invention can be sealed, for example in a plastic-based housing, particularly in an aluminum film coated with plastic. The weight in this case is advantageously less than that of metal housings; there are also advantages in terms of energy density.

The electrochemical composite layer (the electrochemical structural element) can also be embedded between two or more films made of a plastic coated with wax or paraffin. These materials act as a seal and, due to their inherent properties, can also exert mechanical pressure on the composite layer, thereby advantageously achieving improved contact in the composite layer due to the compression.

While the electrochemical element is sealed as described in the foregoing or in some other manner, the interior can be subjected to a pre-determined water/oxygen partial pressure that effects high electrochemical stability. This can be done, for instance, by sealing the electrochemical element in such an environment using parameters that have been selected and adjusted appropriately.

The desired sealing can be improved by (again) adding a swelling agent, e.g. propylene carbonate, to the composite film prior to sealing within or with the respective intended material. Thereby, a tight contact of all components with each other is provided, the cell is sealed against a penetration of gas, and the migration of liquids within the cell is prevented.

In another embodiment of the present invention, a layer is selected for the electrolyte layer that consists of two films of differing composition that have been laminated to one another, each of which being adapted to the electrode with which it is in contact. This has a positive effect on the stability of the phase limits between positive electrode and electrolyte 1 and between negative electrode and electrolyte 2. A concrete example of this embodiment is the use of lithium iodide for the electrolyte material of the first layer and $Li_{1.3}Al_{0.3}Ti_{1.7}(PO_4)_3$ for the electrolyte material of the second layer.

The inventive sequences of layers for the electrochemical structural elements can be arranged in any desired shape. For instance, the flexible composite layers can be rolled up, which achieves a particularly advantageous geometry for compact accumulators. If the accumulator has a small volume, this provides a very large active battery surface.

Non-self-supporting composite layers can also be applied to solid bases like walls for integrated energy storage (self-supporting composite films can of course also be applied or affixed thereto). In this case it is possible to take advantage of large surface areas. The accumulators themselves are not associated with a space requirement. A special example of an embodiment of this type is the integration of composite layers for accumulators into substrates for solar cells. Independent energy supply units can be created in this manner. Layer sequences for accumulators can also be applied to solid or flexible substrates in order to be used as integrated energy storage in electronic structures.

The concrete examples in the following provide a more detailed explanation of the invention.

EXAMPLE 1

1.1. A battery film (negative electrode) for a rechargeable lithium cell is produced by agitating 6 g highly crystalline graphite (Timcal SLM 44), 1.5 g acetylene carbon black (battery quality), 0.6 g ethylene carbonate with 1.5 g polyvinylidene fluoride hexafluoropropylene in about 50 g acetone for at least 4 hours using either a magnetic agitator or a dissolver. First, the mixture is heated to 100° C., and having reached this temperature, it is cooled down to 50° C. and then maintained at said temperature. Once the agitating time has terminated, the mixture is thickened until it can be casted or knife-coated, and the film is extruded using a tape casting equipment. The knife coating slot is selected such that after drying, a film thickness of 150-200 µm is obtained. The film is-dried overnight at 70° C. and 1 mbar final pressure in a vacuum drying cabinet.

1.2. Example 1.1 is repeated, with the modification that 7.5 g MCMB (Osaka gas) is used instead of 6 g graphite and 1.5 g acetylene carbon black.

EXAMPLE 2

2.1. A battery film (electrolyte) for a rechargeable lithium cell is obtained from 9 g finely powdered $LiAlSi_2O_6$ (spodumene), 0.9 g ethylene carbonate, 0.9 g pumice powder, 3.0 g polyvinylidene fluoride hexafluoropropylene, prepared in about 30 g acetone as was the negative electrode, and extruded to a thickness of 70-100 µm.

2.2. Further battery films for a rechargeable lithium cell are prepared from 9.9 g natural spodumene having a grain size in the range of 75 µm, 40 µm or 1 µm, respectively, 0.9 g ethylene carbonate, 3.0 g polyvinylidene hexafluoropropylene, treated in about 30 g acetone like the negative electrode and extruded to a thickness of 70-100 µm.

EXAMPLE 3

A battery film (positive electrode) for a rechargeable lithium cell is prepared from 8 g finely powdered $LiCoO_2$(SC 15, Merck), 1.2 g acetylene carbon black (battery quality), 0.8 g ethylene carbonate, 0.3 g fumed $SiO_2$ (Cab-osil, Fluka), 2.0 g polyvinylidene fluoride hexafluoropropylene, and about 30 g acetone as was the negative electrode.

EXAMPLE 4

The individual films according to examples 1 to 3 are cut to size and then laminated to a complete individual cell.

The completed cell is partly sealed in an aluminum film that is asymmetrically coated with plastic and has a thickness of 60 µm, the gauzes being in contact with the outside using two contact studs. Subsequently, the cell is activated with a second solid electrolyte that is added in an absorbable solution and then tightly sealed.

The following table indicates the electrolyte solutions used:

| Electrode | Solvent (% by weight) | | |
|---|---|---|---|
| | EC | DMC | PC |
| 0.66 mol/l $LiBF_4$ | 64.7 | 33.3 | — |
| 1 mol/l $LiBF_4$ | 66.7 | 33.3 | — |
| 1 mol/l $LiBF_4$ | 63.3 | 31.7 | 5.0 |
| 0.66 mol/l $LiClO_4$ | 66.7 | 33.3 | — |
| 0.66 mol/l $LiNO_3$ | 66.7 | 33.3 | — |

EC = ethylene carbonate
DMC = dimethyl carbonate
PC = propylene carbonate

FIG. 1 shows the cycle behavior of a cell which has been extruded from films according to examples 1.1, 2.1 and 3. The cycles no. 11-22 are illustrated. The 87 mAh cell was constantly charged with a current of about C/4 (20 mA), then was constantly charged with a voltage of 4.1 V until the current had decreased to 10%, and subsequently discharged to 3 V with about C/4 (20 mA). A high cycle stability and reproducibility could be achieved. The different sectional enlargements of cycle no. 12 that are shown in FIGS. 2a and 2b show an extremely small sudden voltage difference (IR drop) when being switched from charging to discharging and vice versa. This and the discharge curve remaining higher than 3.5 V for a long time are directly correlated with a considerable decrease of the internal resistance of the cell.

EXAMPLE 5

A battery film for a primary cell is produced by admixing 9 g fine $MnO_2$ (manganese dioxide), 1.2 g acetylene carbon black (battery quality), 0.9 g ethylene carbonate, 0.9 g kieselguhr, 3.0 g polyvinylidene fluoride hexafluoropropylene in about 30 g acetone and subsequently treating said substances in accordance with example 1.

Observations generally show that the electrochemical functional and processing capability of the films are not affected by the inventive additives.

What is claimed is:

1. Self-supporting layer or layer that is placed on a substrate, comprising a heterogeneous mixture of
   (1) a matrix (A) containing at least one organic polymer, precursor thereof or prepolymer thereof, and
   (2) an electrochemically activatable inorganic material in the form of a solid substance (B), said material being suitable as a solid body electrolyte and not being soluble in said matrix and in water, the solid body electrolyte selected from lithium salts including titanium ions or phosphate groups, characterized in that said layer additionally contains an electrolyte introduced into said layer in a dissolved form.

2. Self-supporting layer or layer that is placed on a substrate in accordance with claim 1, characterized in that said matrix (A) additionally contains a plasticizer.

3. Self-supporting layer or layer that is placed on a substrate in accordance with claim 2, wherein said plasticizer is selected from the group consisting of dimethyl sulfoxide, dimethyl carbonate, ethyl methyl carbonate, diethyl carbonate, methyl propyl carbonate, ethylene carbonate, ethylene sulfite, propylene carbonate, dioxolane, tetrahydrofurane, γ-butyrolactone and mixtures thereof.

4. Self-supporting layer or layer that is placed on a substrate in accordance with claim 1, characterized in that said plasticizer is present in a quantity of 0.05-50% by weight, relative to said electrochemically activatable material.

5. Self-supporting layer or layer that is placed on a substrate in accordance with claim 1, characterized in that the organic polymer of said matrix (A) is selected from the group consisting of natural polymers, synthetic polymers and mixtures thereof.

6. Self-supporting layer or layer that is placed on a substrate in accordance with claim 1, characterized in that said organic polymer is a polymer which is capable of swelling and is a chlorinated or a fluorinated polymer selected from the group consisting of polyvinylidene chloride, polyethylene oxide, polyvinylidene fluoride hexafluoropropylene copolymer, and mixtures thereof.

7. Self-supporting layer or layer that is placed on a substrate in accordance with claim 1, characterized in that said organic polymer is present in a quantity of 0.05 to 50% by weight, relative to the total components of the layer.

8. Self-supporting layer or layer that is placed on a substrate in accordance with claim 1, characterized in that said layer is a flexible film.

9. Self-supporting layer or layer that is placed on a substrate in accordance with claim 1, characterized in that said electrolyte has been introduced into the layer due to a concentration gradient of plasticizer, being dissolved in a plasticizer.

10. Self-supporting layer or layer that is placed on a substrate in accordance with claim 1, characterized in that a liquid electrolyte transported into and stored within the layer contains at least one salt of lithium.

11. Self-supporting layer or layer that is placed on a substrate in accordance with claim 10, characterized in that the at least one salt of lithium is selected from $LiClO_4$, $LiNO_3$, $LiBF_4$, $LiPF_6$, $LiSO_3CF_3$, $LiC(SO_2CF_3)_3$, $Li(CF_3SO_2)_2N$, or mixtures thereof.

12. Self-supporting layer or layer that is placed on a substrate in accordance with claim 1, characterized in that a solvent of a liquid electrolyte transported into and stored within the layer is selected from solvents which are plasticizers for the matrix (A).

13. Self-supporting layer or layer that is placed on a substrate according to claim 1, wherein the solid body electrolyte is selected from the group consisting of natural salts and minerals of lithium, and synthetic lithium salts including titanium ions or phosphate groups.

14. Self-supporting layer or layer that is placed on a substrate according to claim 1, wherein the heterogeneous mixture additionally comprises: (3) a material (C) which differs from material (B) and which is capable of improving the transport of a liquid electrolyte into and the storage thereof within the layer.

15. Composite layer having electrochemical properties, comprising a layer in accordance with claim 1.

16. Composite layer according to claim 15, further comprising a layer suitable as a negative electrode and a layer suitable as a positive electrode.

17. Composite layer in accordance with claim 16, characterized in that the self-supporting layer or layer that is placed on a substrate, after having been laminated, is brought into contact with an additional swelling agent, and is subsequently sealed in a suitable material or housing.

18. Composite layer in accordance with claim 17, wherein the additional swelling agent is propylene carbonate.

19. Rechargeable electrochemical cell made in thick layer technology, comprising a composite layer in accordance with claim 16.

20. Rechargeable electrochemical cell in accordance with claim 19, characterized in that an electrochemically activatable material for the positive electrode layer is selected from the group consisting of lithium cobalt oxide, lithium nickel oxide, nickel manganese oxide, alone, in mixture, or as a multinary compound, optionally substituted by magnesium, aluminum or fluorine, and wherein said electrochemically activatable material for the self-supporting layer or layer that is placed on a substrate is selected from among natural salts and minerals of lithium, and from synthetic lithium salts, and wherein an electrochemically activatable material for the negative electrode layer is selected from the group consisting of carbon modification, titanium dioxide, titanium disulfide, tungsten dioxide, molybdenum dioxide, lithium titanate, a lithium-alloyable metal, semiconductor materials, oxides, iodides, sulfides, nitrides and heterogeneous mixtures thereof.

21. Method for producing a composite layer in accordance with claim 15, characterized in that
   (a) a pasty mass comprising a heterogeneous mixture of
      (1) a matrix (A) containing at least one organic polymer, precursor thereof or prepolymer thereof, and
      (2) an electrochemically activatable inorganic material in the form of a solid substance (B), said material being suitable as a solid body electrolyte and not being soluble in said matrix and in water, the solid body electrolyte selected from lithium salts including titanium ions or phosphate groups, is adapted to have layer form and the layer thus obtained is optionally dried,
   (b) said layer is subsequently laminated to other suitable layers to form a composite layer, and
   (c) the composite layer thus obtained is impregnated with a suitable, dissolved electrolyte such that said electrolyte penetrates into said composite layer, whereupon the composite layer is dried at a temperature in the range of room temperature up to about 70-90° C.

22. Method according to claim 21, characterized in that the electrolyte of step (c) is dissolved in a plasticizer, and that the composite layer obtained according to step (b) does not contain any plasticizer or only contains such a small quantity of plasticizer that due to the plasticizer concentration gradient, the electrolyte solution will penetrate at least partly into the composite layer.

23. Method for producing a self-supporting layer in accordance with claim 1, characterized in that
   (a) a pasty mass comprising a heterogeneous mixture of
      (1) a matrix (A) containing at least one organic polymer, precursor thereof or prepolymer thereof, and
      (2) an electrochemically activatable inorganic material in the form of a solid substance (B), said material being suitable as a solid body electrolyte and not being soluble in said matrix and in water, the solid body electrolyte selected from lithium salts including titanium ions or phosphate groups, is adapted to have layer form and the layer thus obtained is optionally dried, and
   (b) said layer is impregnated with a suitable, dissolved electrolyte such that said electrolyte penetrates into said layer, whereupon the film is dried at a temperature in the range of room temperature up to about 70-90° C.

24. Method according to claim 23, characterized in that the dissolved electrolyte is dissolved in a plasticizer, and that the self-supporting layer obtained according to step (a) does not contain any plasticizer or only such a small quantity of plasticizer that due to the plasticizer concentration gradient, the electrolyte solution will penetrate at least partly into the layer.

* * * * *